United States Patent [19]

Garst

[11] Patent Number: 4,709,501
[45] Date of Patent: Dec. 1, 1987

[54] LURES WITH DISSIMILAR TAIL LENGTHS

[76] Inventor: Gregory C. Garst, Rte. 3, Box 478, Many, La. 71449

[21] Appl. No.: 848,941

[22] Filed: Apr. 7, 1986

[51] Int. Cl.$^4$ ............................................. A01K 85/00
[52] U.S. Cl. ................................. 43/42.24; 43/42.30
[58] Field of Search ................. 43/42.24, 42.26, 42.28, 43/42.30

[56] References Cited

U.S. PATENT DOCUMENTS

| D. 239,281 | 3/1976 | Williams | 43/42.24 |
|---|---|---|---|
| 3,100,360 | 8/1963 | Creme | 43/42.24 |
| 3,992,800 | 11/1976 | Neil | 43/42.24 |
| 4,074,455 | 2/1978 | Williams | 43/42.28 |
| 4,197,667 | 4/1980 | Helfensteine | 43/42.24 |
| 4,214,396 | 7/1980 | Firmin | 43/42.24 |
| 4,316,343 | 2/1982 | Creme | 43/42.24 |

*Primary Examiner*—M. Jordan
*Attorney, Agent, or Firm*—John M. Harrison

[57] ABSTRACT

Lures with dissimilar tail lengths which in one embodiment are characterized by a quad tail lure having a beaded body portion with first and second split tail components extending from a tail base, each of the split tail components characterized by an outside tail segment and a shorter inside tail segment. In a preferred embodiment the tail segments are curved inwardly toward each other in facing relationship and are separated by a slot, wherein the dissimilar tail lengths create two different actions in approximately the same plane at the same time. In another embodiment of the invention a twoin tail lure is disclosed, having a single split tail extending from a tail base with the tail member characterized by a pair of tail segments of dissimilar length. Retrieving the lure in water causes the tails to vibrate or undulate at different speeds in approximately the same plane.

8 Claims, 8 Drawing Figures

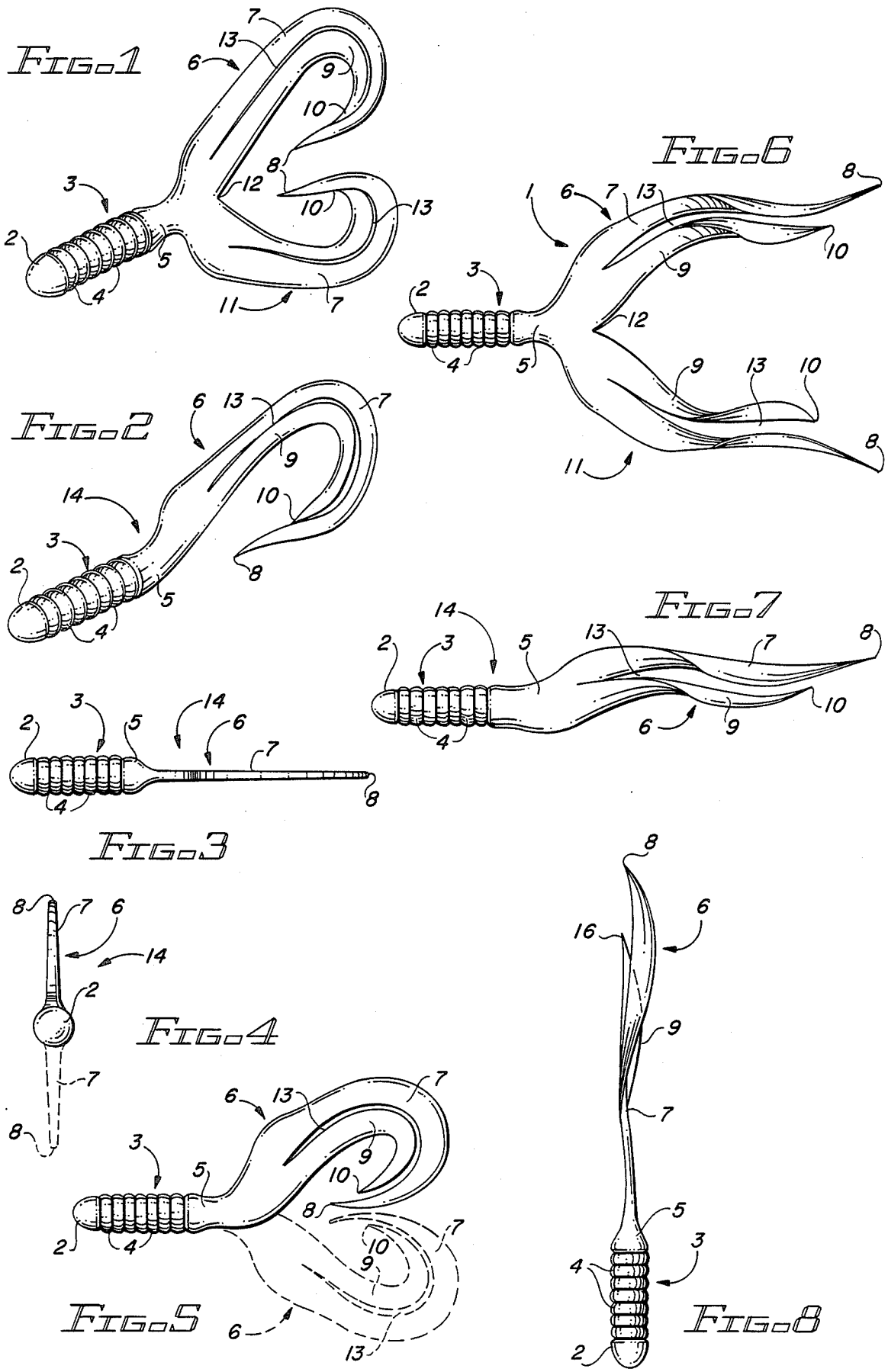

LURES WITH DISSIMILAR TAIL LENGTHS

BACKGROUND OF THE INVENTION

1. Field of Invention

This invention relates to fishing lures and more particularly, to fishing lures of the flexible plastic design which are normally injection molded and are designed to simulate plastic worms, lizards, and other swimming creatures which attract black bass and other game fish.

In recent years the sport of fishing has evolved into a much pursued big business, with millions of dollars spent annually on boats, fishing tackle and lures. With the increased interest and emphasis on taking such popular game fish as black bass, has come an explosion in the development and marketing of improved fishing tackle and new baits and lures in particular. Perhaps the most effective of all lures, particularly in taking the highly respected black bass, is the popular plastic worm-type lure.

The advent of plastic compositions which closely simulate life-like creatures such as worms, lizards, and the like, along with the development of modern injection molding techniques for creating such life-like replicas has resulted in remarkable innovation in the fishing industry. The creation of such new lures and auxiliary tackle for using them, which includes sensitive rods and high strength monofilament line of small diameter has resulted in a multi-million dollar plastic lure industry in the area of sport fishing. It has been found that lures of this design are highly effective in taking game fish such as black bass, small-mouth bass, trout, pike and muskie, as well as a wide variety of salt water fish, with both light and relatively heavy tackle. Furthermore, the plastic lures can be cheaply manufactured in volume quantities and are therefore relatively inexpensive to purchase and they are available in a variety of sizes, shapes, and colors for use under a wide variety of fishing conditions.

Plastic fishing lures are typically used in cooperation with a lead sinker, or helmet which is placed on the fishing line immediately above the hook with the hook projected through the fishing lure in one of a variety of configurations. The lead sinker or helmet allows the worm and the hook to sink to the bottom of the lake or reservoir and the worm is retrieved using a variety of rod actions, depending upon the type of fish sought, the water depth and weather conditions. Alternatively, these lures can be used as "trailers" attached to other baits such as the popular "spinner baits" to attract fish.

Many of these plastic lures are characterized by long, thin ribbon tails which are curved or shaped to present a wiggling or undulating simulated swimming action in the water when retrieved in order to further attract fish to the lure. A wide variety of tail shapes, sizes, and thicknesses are currently used in many of the plastic fishing lures which are on the market today.

2. Description of the Prior Art

Typical of the plastic fishing lures used with good success in taking black bass, small-mouth bass and other game fish is the "curly tail" lure which is characterized by a beaded or smooth body portion having one or more tail segments extending therefrom and curled either inwardly or outwardly to a thin ribbon-like point. When the lure is retrieved, the tail unfurls behind the lure and undulates or folds and unfolds as it "swims" through the water to attract fish. Since the lure is shaped from a plastic material it can be easily injection molded in a wide variety of colors, shapes, and desirable odors can even be synthesized and provided in the lure bodies.

A typical injection molded ribbon tail lure is that disclosed in the "Bass Pro Shops" catalog, page 54, known as the "Sidewinder", a trademark of Bass Pro Shops. This lure is known as "Triple Ripple Pro-Tein Worm", another trademark of Bass Pro Shops and is characterized by a ribbon-like tail with a shaped head, the tail being split into three distinct segments near the end. The split tail is said to give the lure an improved visibility and attractiveness during retrieve.

It is an object of this invention to provide a new and improved soft plastic lure which is characterized by head portion and at least one tail portion extending from the head portion, which tail portion is curved and divided into two distinct segments, one of which segments is longer than the other in order to impart separate, undulating or "wiggling" actions as the lure is retrieved.

Another object of this invention is to provide a new and improved plastic lure which is characterized by a ribbed or beaded body portion with at least one tail portion extending therefrom, which tail portion is curved and is split along its length to a point near the body portion, wherein the two distinct tail elements or segments in each tail portion are dissimilar in length and therefore, "swim", wiggle and undulate at different frequencies in and out of a common plane to create a new and unique swimming action.

Still another object of this invention is to provide a new and improved plastic worm-type lure having a pair of ribbon tails which are oriented in curved, facing relationship from a central body portion, each of which ribbon tails are split along the entire length thereof to define separate tail segments of dissimilar length which facilitates folding and unfolding, fluttering and undulation of the respective tail segments at different rates of speed in and out of the same plane in a simulated swimming action during retrieval to attract fish.

A still further object of the invention is to provide a "curly tail" plastic lure of improved design, which lure includes a pair of curved tail portions extending from a tail base which terminates a central body portion, each of the tail portions characterized by two tail segments separated by a slot, one of which tail segments is longer than the other in order to facilitate repetitive undulation of the pairs of tail segments at different frequencies or folding and unfolding repetition in and out of a common plane.

SUMMARY OF THE INVENTION

These and other objects of the invention are provided in a new and improved soft plastic lure which is characterized in a preferred embodiment by a beaded body portion and at least one curved tail segment extending from the body portion, which tail segment or segments are split from a point near the juncture of the tail and the body portion to the end of the tail segment or segments, in order to define a pair of tail elements for each tail segment, the outer of which tail element is longer than the inner, in order to impart a fluttering or undulating swimming action of different folding and unfolding frequency in each of the tail elements, to attract fish.

BRIEF DESCRIPTION OF THE DRAWING

The invention will be better understood by reference to the accompanying drawing, wherein;

FIG. 1 is a perspective view of a quad tail lure embodiment of this invention;

FIG. 2 is a perspective view of a twin tail lure embodiment of the invention;

FIG. 3 is a top view of the twin tail lure illustrated in FIG. 2;

FIG. 4 is a front view of the twin tail lure illustrated in FIGS. 2 and 3, with a second split tail noted in phantom to illustrate the quad tail lure embodiment of this invention;

FIG. 5 is a side view of the twin tail lure illustrated in FIGS. 2-4, with a second split tail noted in phantom in order to illustrate the quad tail lure embodiment illustrated in FIG. 1;

FIG. 6 is a perspective view of the quad tail lure illustrated in FIG. 1, in retrieving configuration;

FIG. 7 is a perspective view of the twin tail lure illustrated in FIG. 2, in retrieving configuration; and FIG. 8 is a top view of the twin tail lure illustrated in FIG. 7 in retrieving configuration.

DESCRIPTION OF THE PREFERRED EMBODIMENTS

Referring initially to FIG. 1 of the drawings in a preferred embodiment the quad tail lure of this invention is generally identified as reference numeral 1. The quad tail lure 1 includes a rounded head 2 in an elongated, segmented body 3. In a most preferred embodiment of the invention the body 3 is characterized by multiple rounded body beads 4, to enhance the appearance and attractiveness of the body 3 to game fish. The opposite end of the body 3 from the head 2 terminates in a tail base 5, from which a first split tail 6 and a second split tail 11 project in inwardly curving, facing relationship. Both the first split tail 6 and the second split tail 11 are characterized by an outside tail segment 7 and an inside tail segment 9, the outside tail segment 7 being longer than the inside tail segment 9. Each outside tail segment 7 terminates in an outside tail segment tip 8, while each corresponding inside tail segment 9 terminates in an inside tail segment tip 10, positioned inwardly of the outside tail segment tip 8, respectively. When the quad tail lure 1 is not being retrieved, the outside tail segment tips 9 in the first split tail 6 and the second split tail 11, respectively, are located in close proximity to each other near the tail juncture 12. In a most preferred embodiment of the invention, a slot 13 is provided between the outside tail segment 7 and the inside tail segment 9, respectfully, of both the first split tail 6 and the second split tail 11, in order to divide the first split tail 6 and second split tail 11 and enhance the action of each outside tail segment 7 and inside tail segment 9 as the lure "swims" through the water during retrieval, as hereinafter described. Alternatively, each outside tail segment 7 and inside tail segment 9 can be created by splitting the first split tail 6 and second split tail 11 or by molding the outside tail segment 7 and inside tail segment 7 without the slot 13, according to well know production techniques.

Referring now to FIGS. 2-5 of the drawing in another preferred embodiment of the invention a twin tail lure 14 is illustrated with a bullet-shaped head 2, a body 3 preferably characterized by body beads 4 and a tail base 5, to which is attached a first split tail 6, as in the case of the quad tail lure 1 illustrated in FIG. 1. In another most preferred embodiment of the invention, the first split tail 6 is characterized by a curved outside tail segment 7 terminating in an outside tail segment tip 8 and a shorter, curved inside tail segment 9 terminating in an inside tail segment tip 10. As in the case of both the first split tail 6 and the second split tail 11 illustrated in the quad tail lure 1, the inside tail segment tip 10 in the twin tail lure 14 is located inwardly of the outside tail segment tip 8 and farther from the tail base 5, than the outside tail segment tip 8 when the twin tail lure 14 is in the relaxed configuration. Furthermore, in yet another most preferred embodiment of the invention a slot 13 is provided between the outside tail segment 7 and the inside tail segment 9, in order to facilitate greater freedom of movement between the outside tail segment 7 and the inside tail segment 9 when the twin tail lure 14 is retrieved, as hereinafter described. In a further most preferred embodiment of the invention it will be appreciated that the twin tail lure 14 is designed exactly in the same manner as the quad tail lure 1, with the absence of the second split tail 11. Accordingly, as illustrated in FIGS. 4 and 5, the addition of a second split tail 11, illustrated in phantom, transforms the twin tail lure 14 into the quad tail lure 1 illustrated in FIG. 1.

Referring now to FIGS. 1 and 6-8 of the drawings, the end portions of the outside tail segments 7 and inside tail segments 9 undulate and fold in and out of a common plane as the quad tail lure 1 and twin tail lure 14 are retrieved through water in a simulated swimming action. Because the first split tail 6 and second split tail 11 are connected to a common tail base 5 in substantially the same plane in the quad tail lure 1, both sets of outside tail segments 7 and inside tail segments 9 undulate and "swim" in and out of this plane. Furthermore, the outside tail segments 7 in each of the first split tail 6 and the second split tail 11 in the quad tail lure 1 and the sole outside tail segment 7 in the twin tail lure 14 undulate at a lower frequency or rate than the corresponding inside tail segments 9 because of the disparity in lengths between the respective outside tail segments 7 and inside tail segments 9. It will be apparent to those skilled in the art that substantially straightening the outside tail segments 7 and the inside tail segments 9 of both the first split tail 6 and the second split tail 11 in the quad tail lure 1 and the twin tail lure 14 by water pressure during retrieval of both the quad tail lure 1 and the twin tail lure 14 causes one or more folds to occur in the outside tail segments 7 and inside tail segments 9, respectively, at various points between the outside tail segment tips 8 and the inside tail segment tips 10 respectively, and the tail base 5 while the quad tail lure 1 and twin tail lure 14 are "swimming" during retrieval.

Referring to FIG. 8 of the drawings, when the twin tail lure 14 is retrieved through the water the outside tail segment 7 and inside tail segment 9 flow rearwardly from the tail base 5 and tend to fold and unfold in a repeating pattern in and out of a common plane bisecting the first split tail 6, which pattern is executed more rapidly in the inside tail segment 9 than in the outside tail segment 7, because of the relative disparity in lengths between the inside tail segment 9 and outside tail segment 7. This same swimming phenomenon occurs with respect to the second split tail 11, provided in the quad tail lure 1. Accordingly, when the quad tail lure 1 is retrieved in a body of water, each outside tail segment 7 and inside tail segment 9 folds and unfolds through a common plane which bisects the first split tail 6 and second split tail 11.

It will be appreciated by those skilled in the art that an essential feature of this invention is the creation of a plastic lure having an outside tail segment 7 and an inside tail segment 9 of dissimilar length in at least one first split tail 6 which is curved from a tail base 5 to an outside tail segment tip 8 and inside tail segment tip 10, respectively. It has been demonstrated that the fluttering and undulating action of the outside tail segments 7 and inside tail segments 9 in and out of a common plane at different "swimming" frequencies or fluttering speed presents an unparalleled attraction to game fish and black bass in particular. Furthermore, while the presence of the slot 13 serves to promote easy movement of the outside tail segments 7 past the inside tail segments 9 in both the quad tail lure 1 and the twin tail lure 14, it has been found that creation of an effective "swimming" action in each outside tail segment 7 and inside tail segment 9 can also be achieved by splitting the first split tail 6 and second split tail 11 down the middle or molding the individual outside tail segments 7 and inside tail segments 9 without creating the slot 13, as heretofore described.

It will further be appreciated by those skilled in the art that the degree of curvature in both the first split tail 6 and second split tail 11 can be varied, so long as the respective outside tail segments 7 and inside tail segments 9 are sufficiently curved to permit folding and unfolding due to water pressure upon retrieval. Similarly, the shape and thickness of the first split tail 6 and second split tail 11 may vary, and the relative width of the respective outside tail segments 7 and inside tail segments 9 may be different, so long as each outside tail segment 7 and inside tail segment 9 are of dissimilar length and the "swimming" function is not impaired.

Furthermore, the first split tail 6 and second split tail 11 may project individually, in the case of the twin tail lure 14, or in concert, in the case of the quad tail lure 1, from a tail base 5 and body 3 of varying design, according to the knowledge of those skilled in the art. Accordingly, the body beads 4 can be replaced with a smooth surface and the cross-section of the body 3 can be altered, as desired, in order to simulate various food or the like, which attract fish.

While the preferred embodiments of the invention have been described above it will be recognized and understood that various modifications may be made therein and the appended claims are intended to cover all such modifications which may fall within the spirit and scope of the invention.

Having described my invention with the particularity set forth above, what is claimed is:

1. A fishing lure comprising a body portion; at least one curved, flexible split-tail portion extending outwardly and rearwardly from a point of attachment to said body portion and curving inwardly toward said point of attachment; and a slot provided in said split-tail portion, said slot defining an outside tail segment extending substantially the entire length of said split-tail portion and defining an outside element of said split-tail portion, and an inside tail segment defining an inside element of said split-tail portion, said inside tail segment being shorter than said outside tail segment, said slot separating said outside tail segment and said inside tail segment, whereby said inside tail segment and said outside tail segment are free to independently flutter with respect to each other at different frequencies in and out of a plane bisecting said outside tail segment and said inside tail segment when said lure is retrieved through a body of water.

2. The fishing lure of claim 1 wherein said at least one curved, flexible split-tail portion is a first split-tail portion and a second split-tail portion; said outside tail segment is a first outside tail segment defining an outside element of said first split-tail portion and a second outside tail segment defining an outside segment of said second split-tail portion; and said inside tail segment is a first inside tail segment defining an inside element of said first split-tail portion and a second inside tail segment defining an inside element of said second split-tail portion.

3. The fishing lure of claim 1 wherein the ends of said outside tail segment and said inside tail segment taper substantially to a point.

4. The fishing lure of claim 1 wherein:
(a) said at least one curved, flexible split-tail portion is a first split-tail portion and a second split-tail portion; said outside tail segment is a first outside tail segment defining an outside element of said first split-tail portion and a second outside tail segment defining an outside segment of said second split-tail portion; and said inside tail segment is a first inside tail segment defining an inside element of said first split-tail portion and a second inside tail segment defining an inside element of said second split-tail portion; and
(b) the ends of said outside tail segment and said inside tail segment each taper substantially to a point.

5. The fishing lure of claim 1 further comprising a plurality of bead elements shaped into said body portion to define a segmented body portion of said lure.

6. The fishing lure of claim 5 wherein said split-tail portion curves from an area of attachment to said body portion to point of termination facing said area of attachment to said body portion.

7. A fishing lure comprising an elongated, flexible body portion, a flexible, ribbon-like first split-tail portion curving from a first point of attachment to said body portion and ending at a first point of termination substantially in alignment with said body portion; a flexible, ribbon-like second split-tail portion curving from a second point of attachment to said body portion and ending at a second point of termination spaced from said first point of termination adjacent said first point of termination and substantially in alignment with said body portion; a first slot provided in said first split-tail portion, said first slot defining a first outside tail segment and a first inside tail segment, said first inside tail segment being shorter than said first outside tail segment; and a second slot provided in said second split-tail portion, said second slot defining a second outside tail segment and a second inside tail segment, said second inside tail segment being shorter than said second outside tail segment, whereby said first outside tail segment and said second outside tail segment freely undulate at a first frequency and said first inside tail segment and said second inside tail segment freely undulate at a second frequency which is different from said first frequency, responsive to retrieval of said lure in a body of water.

8. The fishing lure of claim 7 further comprising a plurality of bead elements shaped into said body portion to define a segmented body portion of said lure.

* * * * *